US006213146B1

(12) United States Patent
Risch et al.

(10) Patent No.: US 6,213,146 B1

(45) Date of Patent: Apr. 10, 2001

(54) VALVE ASSEMBLY FOR PREVENTING LIQUID INGESTION AND METHODS

(75) Inventors: Daniel T. Risch, Burnsville; Gary R. Gillingham, Prior Lake; Fred H. Wahlquist, Bloomington; Wayne M. Wagner, Apple Valley; Joseph C. Tokar, Apple Valley; Bernard A. Matthys, Apple Valley; Pete A. Betts, Prior Lake, all of MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 09/456,751

(22) Filed: Dec. 7, 1999

Related U.S. Application Data

(62) Division of application No. 09/154,993, filed on Sep. 17, 1998, now Pat. No. 6,009,898.

(51) Int. Cl.[7] .......... F16K 31/18

(52) U.S. Cl. .......... 137/544; 96/406; 137/388

(58) Field of Search .......... 137/388, 544; 96/406; 123/198 E

(56) References Cited

U.S. PATENT DOCUMENTS

| | | |
|---|---|---|
| 165,435 | 7/1875 | Yagn . |
| 515,105 | 2/1894 | Baum . |
| 1,482,848 | 2/1924 | Johnson . |
| 1,851,084 | 3/1932 | Brown et al. . |
| 2,496,470 | 2/1950 | Hodsdon . |
| 3,082,465 | 3/1963 | Wood . |
| 3,166,083 | 1/1965 | Girden . |
| 3,628,559 | 12/1971 | Branko . |
| 3,653,534 | 4/1972 | Barthel . |
| 3,775,951 | 12/1973 | Eicholz et al. . |
| 3,812,813 | 5/1974 | Dickson . |
| 3,816,982 | 6/1974 | Regnault . |
| 4,776,060 | 10/1988 | Chang . |
| 4,860,703 | 8/1989 | Boda et al. . |
| 5,034,036 | 7/1991 | Creek et al. . |
| 5,558,549 | 9/1996 | Nakase et al. . |
| 5,564,513 | 10/1996 | Wible et al. . |
| 5,575,247 | 11/1996 | Nakayama et al. . |

FOREIGN PATENT DOCUMENTS

| | | |
|---|---|---|
| 196 13 860 A1 | 10/1997 | (DE) . |
| 197 10 056 A1 | 9/1998 | (DE) . |
| 1 478 667 | 7/1977 | (GB) . |

*Primary Examiner*—Gerald A. Michalsky
(74) *Attorney, Agent, or Firm*—Merchant & Gould P.C.

(57) ABSTRACT

A valve assembly includes a housing and a float. The housing is constructed and arranged to inhibit movement of the float between a resting position to a position where it is situated in its valve seat, unless a selected liquid volume within the valve housing is attained. In one embodiment, a series of projection members or rings creates a tortuous path, such that there is no clear path for the float to reach the valve seat. In another embodiment, vacuum pressure is created between the float and its cup support. Still other embodiments utilize magnets, springs, linkages, and bent wires. Methods for preventing liquid ingestion into an engine through an air intake are also provided.

20 Claims, 15 Drawing Sheets

VALVE ASSEMBLY FOR PREVENTING LIQUID INGESTION AND METHODS

This application is a Divisional of application Ser. No. 09/154,993, filed Sep. 17, 1998, now U.S. Pat. No. 6,009, 898, which application(s) are incorporated herein by reference.

FIELD OF THE INVENTION

This invention is directed to valve assemblies and air cleaners. More specifically, this invention is directed to a valve assembly for an engine air cleaner to prevent the ingestion of liquid into an engine through the air intake of the engine.

BACKGROUND OF THE INVENTION

Certain types of motor vehicles such as four wheel drive sport utility vehicles, light trucks, agricultural vehicles, watercraft, all-terrain, military vehicles and mining vehicles at times may be operated in off-road areas. Such vehicles can typically have engine sizes of under 1 liter to more than 20 liters piston displacement, and horsepower of less than 10 to more than 1500 (7.5–1118 kw). In this off-road environment, vehicles may encounter liquid obstacles, such as rivers, streams, water-filled ditches, or water-filled ravines.

Crossing these liquid obstacles can have serious consequences if the depth of the liquid is deeper than the height of the engine air intake on the vehicle. If more than just a small amount of water enters the engine air intake, engine damage may occur. Such damage may include hydrostatic lock. If an engine cylinder gets more water in it than its compressed volume, the engine stops instantly and major engine damage, such as bent piston connecting rods may result.

SUMMARY OF THE INVENTION

In one aspect, the invention is directed to a valve assembly for preventing liquid ingestion into an engine through the air intake of the engine. The valve assembly is configured and arranged to prevent the valve assembly from closing when conditions do not warrant its closing, due to vibration and bounce, for example.

In one embodiment, the valve assembly includes a housing defining an open interior, an inlet port, a valve seat having an outlet port extending therethrough and a float support region. The inlet port and the outlet port are in fluid communication with the open interior. The valve assembly includes a float within the housing. The float is movable between first and second positions along a float path. The first position includes the float being positioned within the float support region of the housing. The second position includes the float positioned within the valve seat to obstruct the outlet port in response to a selected liquid volume within the housing. The housing is constructed and arranged to inhibit movement of the float along the float path to the second position, unless the selected liquid volume within the housing is attained.

In one embodiment, the housing comprises projection members constructed and arranged to obstruct the float path. For example, the projection members include first and second eccentric, spaced rings positioned within the housing along the float path. In this manner, there is no clear path for the float to follow, in order to reach the valve seat in the second position.

In another embodiment, the float comprises a spherical ball, and the housing includes a cup member for holding the ball in the float support region. The cup is constructed and arranged to retain the float within the cup by vacuum pressure.

In another embodiment, the housing includes a magnet in the float support region, and the float includes a metallic material attracted to the magnet.

In another aspect, the invention is directed to an air cleaner assembly comprising an air cleaner housing having an air inlet and an air outlet. A filter element is positioned within the housing, downstream of the inlet and upstream of the outlet. A valve assembly is positioned downstream of the filter element within the air cleaner housing. The valve assembly includes a float and a valve seat. The valve seat circumscribes the air outlet. The float is movable between first and second positions along a float path. The first position includes the float being positioned away from the valve seat. The second position includes the float being positioned within the valve seat to obstruct the air outlet in response to a selected liquid volume within the housing. The air cleaner housing is constructed and arranged to inhibit movement of the float along the float path to the second position, unless the selected liquid volume within the housing is attained.

In one example, the valve assembly includes a cylindrical tube holding the float in the first position. The cylindrical tube is, for example, lined with obstruction members projecting inwardly to inhibit float movement along the float path.

In another arrangement, the valve assembly includes a cup member for holding the float in the first position. The cup is constructed and arranged to retain the float within the cup by vacuum pressure.

Methods for preventing liquid ingestion into an engine through the air intake of the engine are provided. In one method, a valve assembly is provided upstream of the engine. The valve assembly has a float and a valve seat. The float is movable along a float path between a first position away from the valve seat and a second position blocking the valve seat. Movement of the float is inhibited along the float path to prevent movement of the float to the second position, unless a selected liquid volume within the valve assembly is attained. Example methods include constructions as described herein.

It is to be understood that both the foregoing general description and the following detailed description are exemplary and explanatory only, and are not restrictive of the invention, as claimed.

The accompanying drawings, which are incorporated in and constitute a part of this specification, illustrate example embodiments of the invention and together with the description, serve to explain the principles of the invention.

IN THE DRAWINGS

DETAILED DESCRIPTION OF THE PREFERRED EMBODIMENTS

Figure 1:
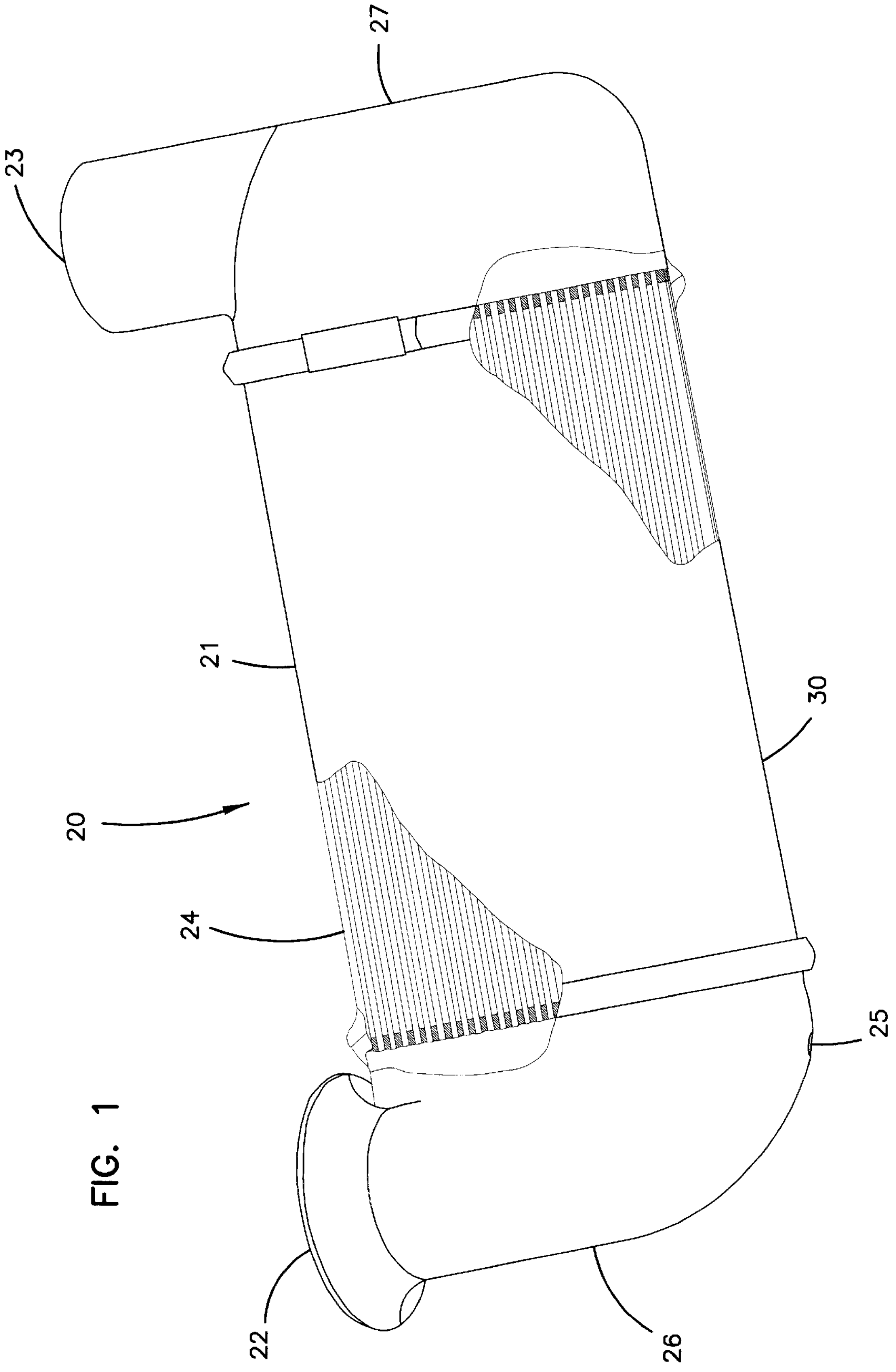
FIG. 1 is a schematic, side elevational view of an embodiment of an air cleaner housing, partially broken away depicting a filter element, in which a valve assembly of the present invention may be utilized.

In FIG. 1, an air cleaner is shown generally at 20. Air cleaner 20 may be used to filter and clean air as it is being drawn into an engine for combustion purposes. Air cleaner 20 is suitable for engines having sizes with a piston displacement in a range from about 2–8 liters, and horsepower of 100–300 horsepower (about 75–224 kw). Air cleaner 20 includes a housing 21, an air inlet 22, and an air outlet 23. Also within housing 21 is a filter element 24. Filter element 24 includes a media construction for cleaning and filtering particles from the air, to ensure only clean air is vented into the engine intake. Filter element 24 may include a variety of media constructions and material. In the particular embodiment illustrated, filter element 24 is a rolled, corrugated cellulose media, having an oval-shaped profile. Media constructions of this type are described further in commonly assigned and co-pending U.S. patent application Ser. No. 08/639,371, filed on Apr. 26, 1996, now U.S. Pat. No. 5,820,646, and incorporated by reference herein. Also shown in FIG. 1, housing 21 defines an aperture 25 in the inlet region 26 of the housing 21. As will be described further below, aperture 25 functions as a liquid or water drainage hole.

Inlet 22 is positioned upstream of filter element 24. Filter element 24 is positioned upstream of outlet 23. In operation, air cleaner 20 is oriented upstream of an engine. Air is taken through inlet 22 and then passes through element 24. Element 24 cleans or filters particles from the air. The air then passes downstream to outlet assembly 27, and then through outlet member 23. The cleaned air then, typically, passes into the engine for combustion.

Figure 2:
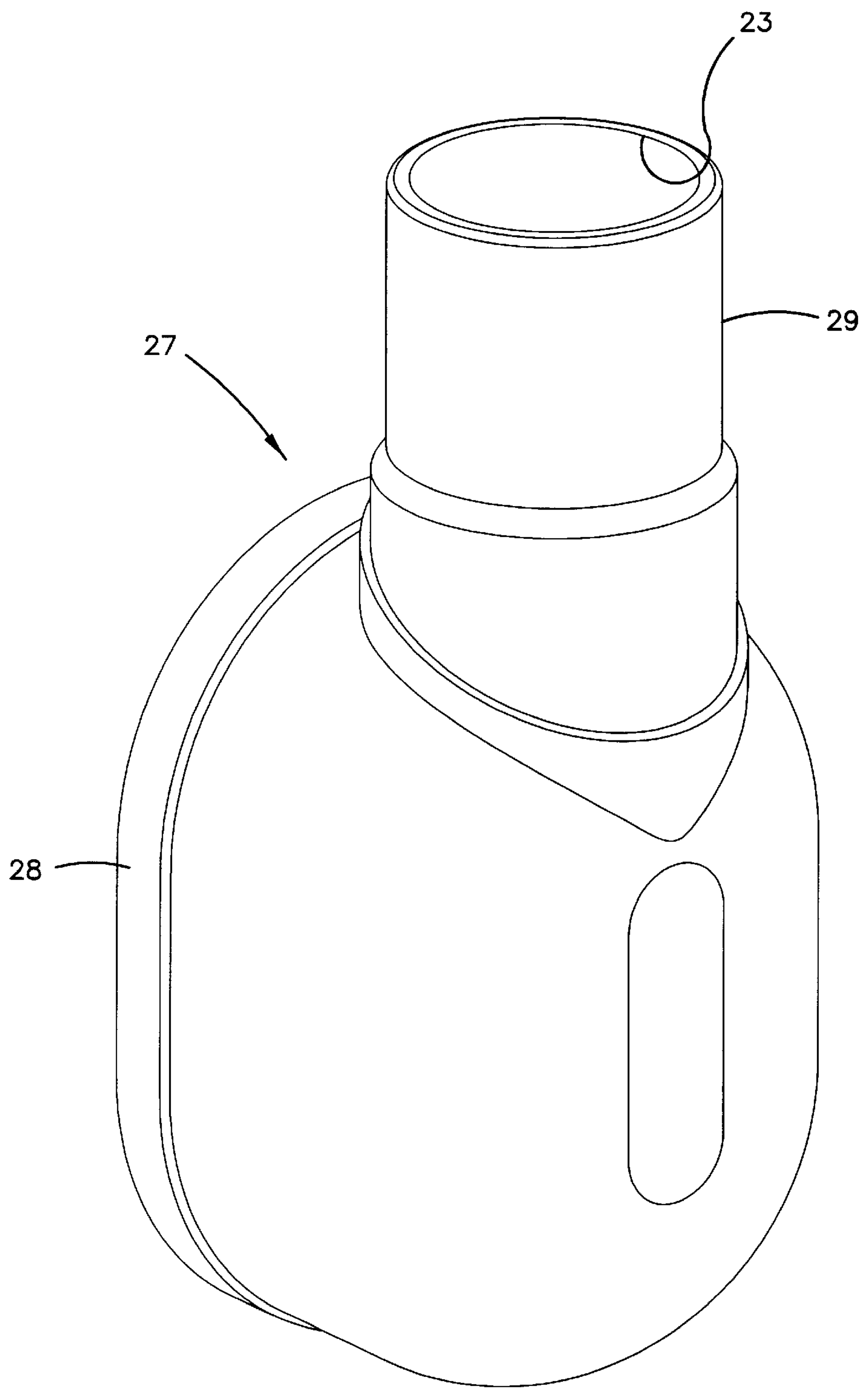
FIG. 2 is a perspective view of an embodiment of an outlet chamber of the air cleaner housing depicted in FIG. 1, usable to house a valve assembly in accordance with principles of the present invention.

In reference now to FIG. 2, a perspective view of outlet assembly 27 is illustrated. Outlet assembly 27 for example includes a first construction 28 and an outlet tube construction 29. First construction 28 is oriented for engagement with element section 30, FIG. 1, of housing 21. That is, after air flows through element 24, it passes into first construction 28. Outlet tube construction 29 is oriented in extension from first construction 28 and projects or extends from first construction 28. Outlet tube construction is part of a valve assembly 40, described further below.

Figure 3:
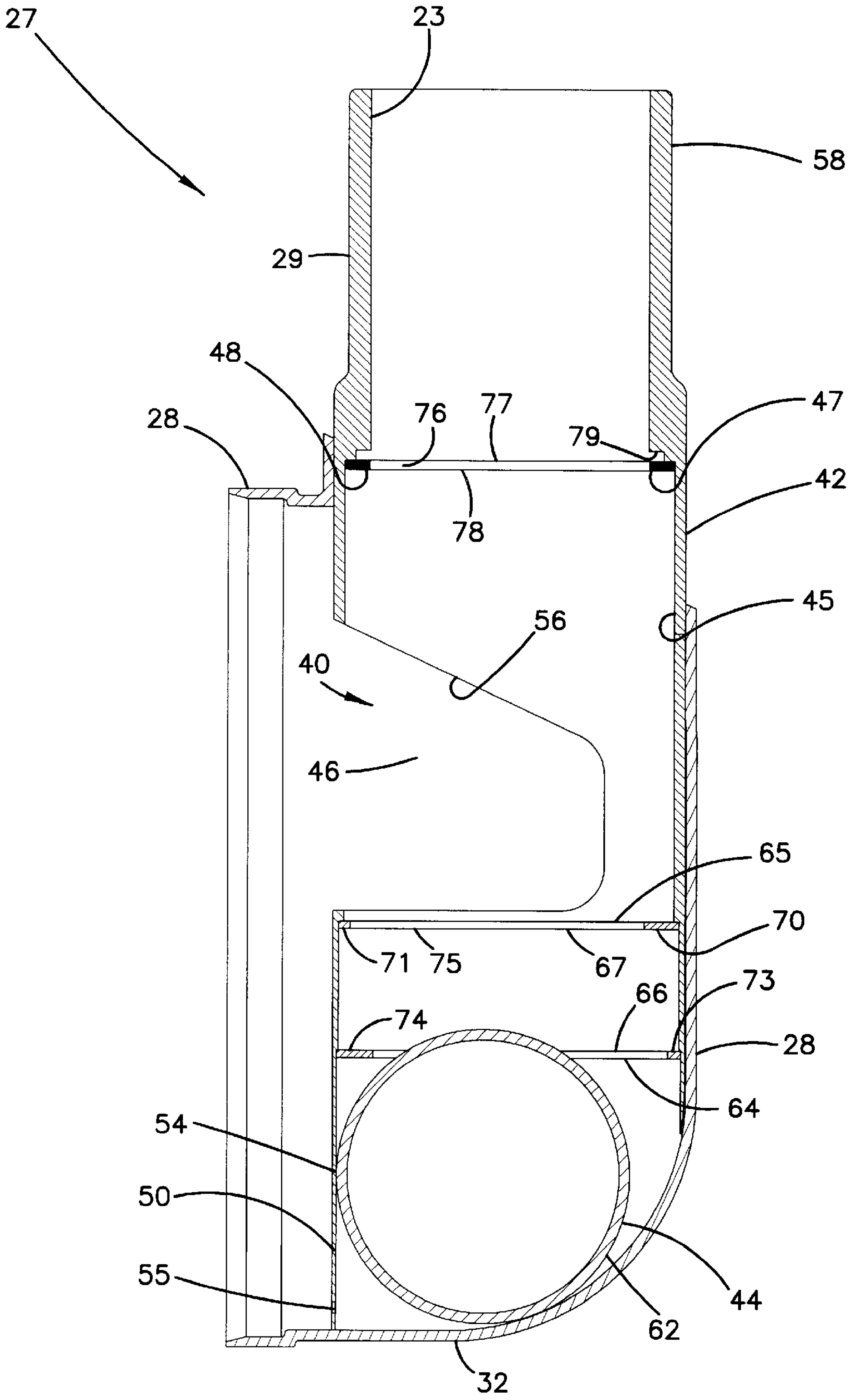
FIG. 3 is a schematic, cross sectional view of the embodiment of the outlet housing depicted in FIG. 2, and showing a valve assembly, in accordance with the principles of the present invention.

In reference now to FIG. 3, one example outlet assembly 27 is shown in cross-sectional view. As can be seen in FIG. 3, outlet assembly 27 houses or contains valve assembly 40 within it. Valve assembly 40 is conveniently located within outlet assembly 27, such that no additional parts or accessories need to be installed within what may sometimes be a very confined region under the hood of a sports utility vehicle. Valve assembly 40 is, for example, located just upstream of the air intake to the engine, in order to prevent the ingestion of water or other liquid into the engine through the air intake.

In general, one example valve assembly 40 includes a housing construction 42 and a float 44. The example housing construction 42 defines an open interior 45, an inlet port 46, a valve seat 47 defining an outlet 48 extending therethrough, and a float support region 50.

To summarize operation of the example valve assembly 40, when liquid, such as water, fills valve assembly 40 by entering through inlet port 46, float 44 moves or floats with the level of liquid from the float support region to the valve seat 47. When seated within valve seat 47, float 44 blocks outlet port 48. This blockage prevents liquid from passing through outlet tube 23. This also blocks the intake of air into an engine, which shuts the engine down and prevents the water or liquid from being ingested. When the liquid level drops, float 44 leaves valve seat 47, and the engine may be restarted without damaging the engine. As shown in FIG. 1, aperture 25 is provided to function as a liquid drain hole in the inlet region 26, which is typically the lowest point of the air cleaner 20 when mounted in a vehicle, to allow water or liquid to drain out of the air cleaner 20.

Valve assembly 40 also includes structure to inhibit or prevent the valve outlet port 48 from closing, when conditions do not warrant it to be closed. In other words, structure is provided in valve assembly 40 to inhibit, impede, or prevent float 44 from becoming seated onto valve seat 47, unless the appropriate liquid level within first construction 28 and housing construction 42 is attained. This structure is provided because if outlet port 48 is blocked, the engine will shut down. For example, engine shutdown is desired only if there is a danger of liquid being drawn into the engine through the air intake. Example constructions to inhibit movement of the float 44 are described herein below.

Figure 4:
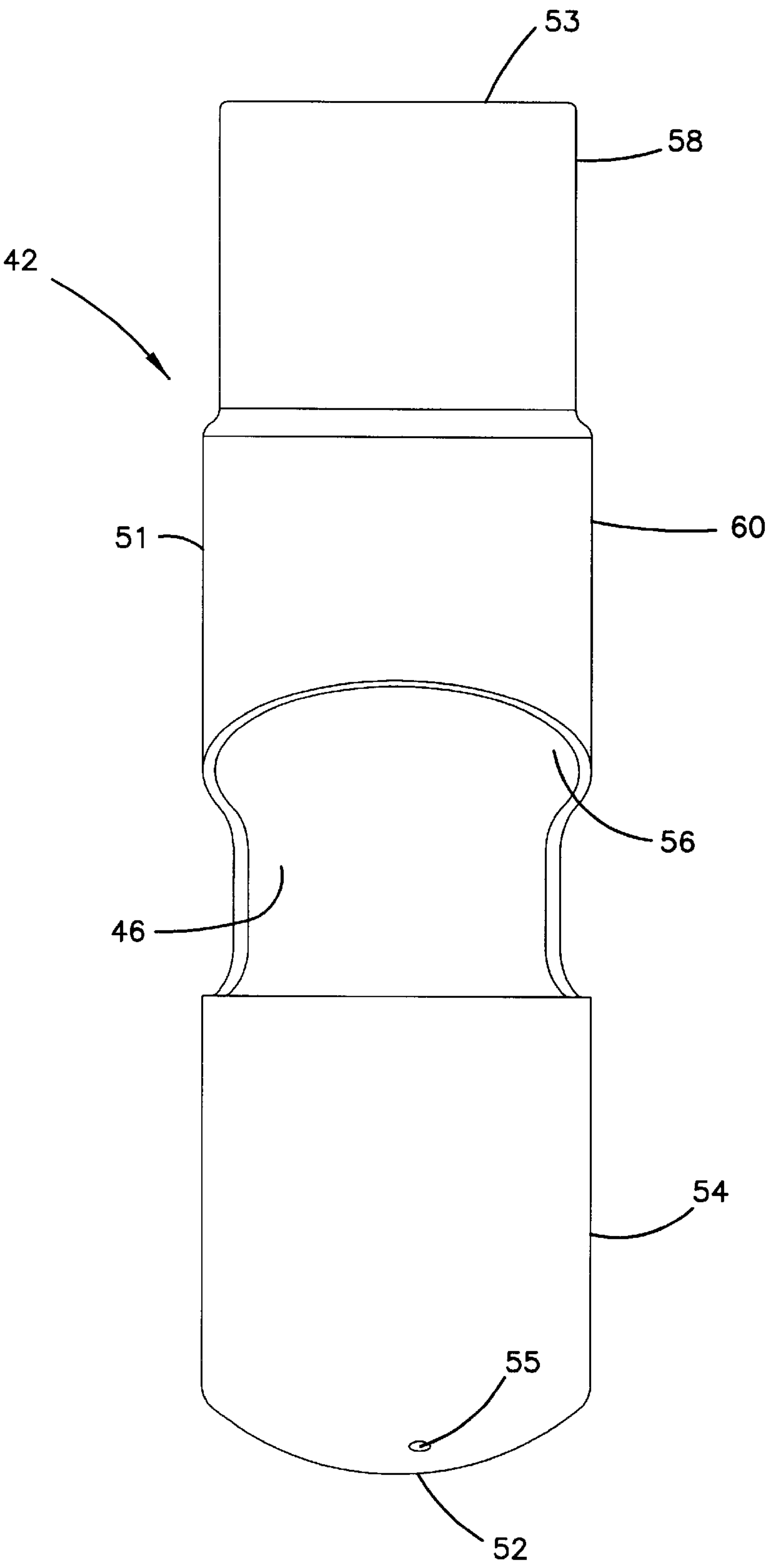
FIG. 4 is a front side elevational view of one embodiment of the valve assembly, depicted in FIG. 3, in accordance with principles of the present invention.

In reference now to FIG. 4, valve housing construction 42 is shown in front side elevational view. One example housing construction 42 shown is a tubular, or cylindrical extension 51 having a bottom or first end 52 and an opposite top or second end 53. Adjacent to first end 52 of extension 51 is wall member 54. Wall member 54 functions to contain float 44 (FIG. 3) within the float support region 50 of the valve assembly 40. Wall member 54 functions as a baffle to shelter float 44 from air flow as it flows from element section 30 (FIG. 1) to outlet 23 (FIG. 3). Stated another way, baffle or wall member 54 blocks air flow from hitting float 44 when float 44 is in float support region 50 (FIG. 3) so that air flow does not lift float 44 and position it into valve seat 47 (FIG. 3). Wall member 54 defines a drainage aperture 55 therein. Drainage aperture 55 allows liquid to drain from float support member 50.

Adjacent to wall member 54, valve housing construction 42 can define a cut-away or open window region 56. Window region 56 defines valve inlet port 46. Window region 56 is constructed and arranged to allow for air flow to pass therethrough, but it is small enough to prevent float 44 from passing therethrough. That is, a smallest dimension across float 44 is larger than any largest dimension across window region 56. This is to prevent float 44 from leaving housing construction 42 and traveling to other regions of air cleaner 20. Therefore, the housing construction 42, including the size and shape of window region 56, operates as a cage assembly, in that it is configured and arranged to keep float 44 within housing construction 42 and on its float path between the float support region 50 and valve seat 47.

Still referring to FIG. 4, housing construction 42 can define a tubular or cylindrical outlet tube 58 at the second end 53. Outlet tube 58 has a largest cross-sectional inside dimension (diameter) that is, for example, smaller than the largest cross-sectional inside dimension (diameter) of extension 51 at tube region 60. Due to the differences in inside diameters between tube region 60 and outlet tube 58, valve seat 47 (FIG. 3) is formed at the transition region therebetween. Wall member 54 and tube region 60 have a largest cross-sectional inside dimension (diameter) that is larger than a largest cross-sectional outside dimension of float 44. If using a spherical float 44, the largest cross-sectional dimension inside (diameter) of outlet tube 58 is, for example, smaller than the largest cross-sectional diameter of float 44. In this way, float 44 is allowed to move between float support region 50 and valve seat 47, and block outlet port 48 when float 44 is seated against valve seat 47 (FIG. 3). If the float 44 is shaped in something other than a spherical shape, one skilled in the art will appreciate that the relative relationship between the dimensions of the float 44 and the outlet tube 58 is adjusted such that the float 44 will be permitted to move between the float support region 50 and valve seat 47 and block the outlet port 48 when the float 44 is seated against the valve seat 47 (FIG. 3).

Referring again to FIG. 3, float 44 is shown in cross-section. In the example shown, float 44 includes a symmetrical construction, such that the orientation of float 44 is irrelevant when it is seated within valve seat 47. In the embodiment illustrated, float 44 is a spherical ball 62. For example, ball 62 comprises a material having a density less than that of water, such that it will float in water. One construction of ball 62 may be polypropylene, 0.09 inches (about 2.3 mm) thick. The diameter of ball 62 may be, for example, from about 1–6 inches (about 25.4–152.4 mm), for example, 2.245–2.75 inches (about 57–69.9 mm), or for example, about 2.5 inches (about 63.5 mm). Ball 62, for example, if having a diameter of 2.5 inches (about 63.5 mm), would be hollow and weigh no more than about 30 grams.

Still in reference to FIG. 3, valve housing construction 42 is constructed and arranged to inhibit movement of the float 44 along the float path to a position where it is seated within valve seat 47, unless a selected liquid volume within the housing is attained. That is, unless liquid fills the interior of valve housing construction 42, housing construction 42 includes structure to prevent the float 44 from being seated within valve seat 47.

As embodied herein, one example valve housing construction 42 comprises projection members 64, 65 constructed and arranged to obstruct the float path. As used herein, the term "float path" refers to the region between first end 52 of float support region 50 and valve seat 47. In the FIG. 3 embodiment, the float path is generally a linear configuration. However, in other embodiments, FIG. 6 for example, the float path is non-linear and may be curved.

For example, projection members 64, 65 function to interfere with float 44 as it moves from a resting position in float support region 50 and against the wall 32 of outlet assembly 27. FIG. 3 shows float 44 in a resting position. In the resting position, float 44 is, for example, within float support region 50 and touches and engages wall 32. It should be understood, however, that a variety of resting positions are contemplated and can include many positions where the float 44 is not seated in valve seat 47 and where float 44 is not within the float support region 50.

While a variety of working embodiments are contemplated herein, in the particular embodiment illustrated in FIG. 3, projection members 64, 65 comprise first and second rings 66, 67. First and second rings 66, 67 are, for example, eccentrically shaped and eccentrically aligned.

Figure 5:
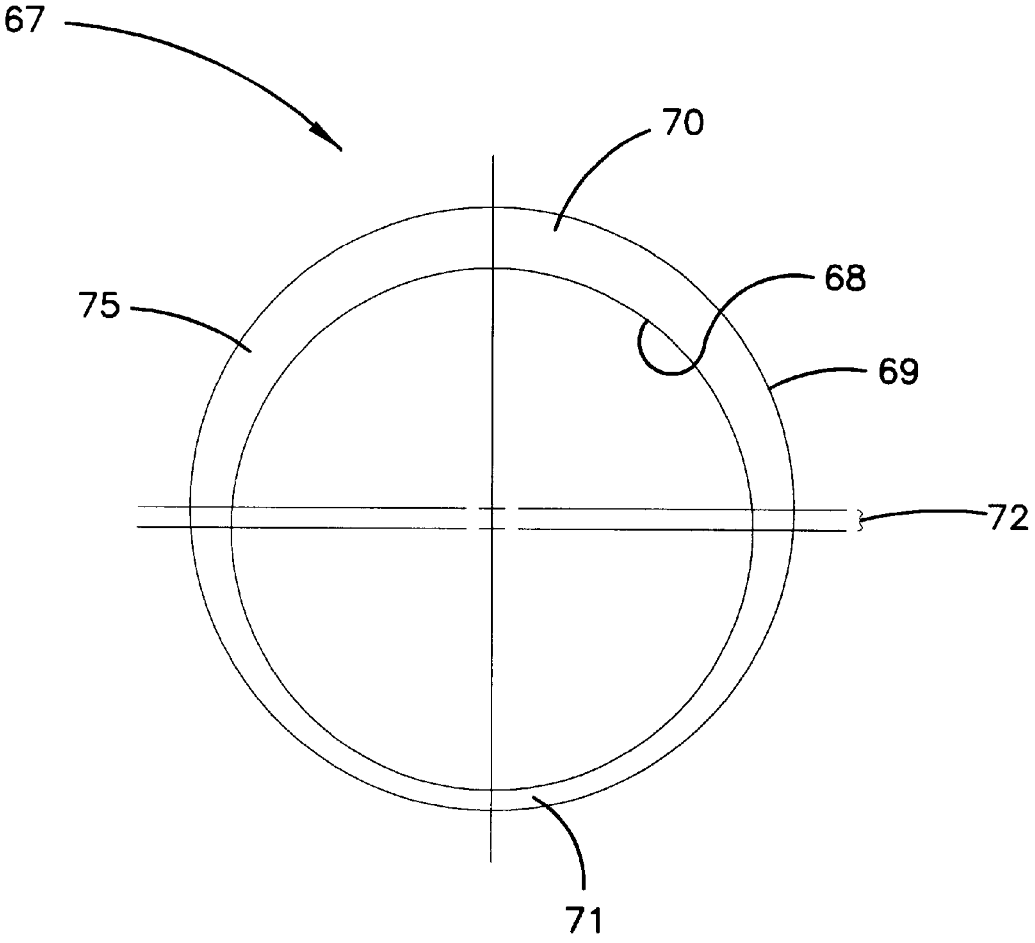
FIG. 5 is a schematic, top plan view of a ring construction usable in the valve assembly, and depicted in FIG. 3.

Turning now to FIG. 5, second ring 67 is schematically illustrated in top plan. The example ring 67 shown includes an inner rim 68 and an outer rim 69. Inner rim 68 defines a circular diameter of about 2.51 inches, specifically, about 2.505 inches. Outer rim 69 defines a circular diameter of about 2.9 inches. As also shown in FIG. 5, the circumferential region defined between inner rim 68 and outer rim 69 varies in width between wide portion 70 and narrow portion 71. The centers of circles defined by inner rim 68 and outer rim 69 are, for example, co-linear and spaced from each other a distance 72 of about 0.10 inches (about 2.5 mm). Second ring 67 defines a cross-sectional thickness of about 0.06 inches (about 1.5 mm).

In some constructions, the first ring 66 is analogously constructed as second ring 67. However, the diameter of the outer rim of first ring 66 is about 2.94 inches (about 74.7 mm).

Attention is again directed to FIG. 3. Note that first and second rings 66 and 67 are, for example, oriented relative to each other such that wide portion 70 of second ring 67 is co-linearly aligned with narrow portion 73 of first ring 66. Similarly, narrow portion 71 of second ring 67 is aligned with wide portion 74 of first ring 66. In this manner, the centers defined by each respective inner rim of first and second rings 66, 67 are not coaxially aligned. This creates a tortuous, obstructed path for float 44.

In general, it has been found that the preferred first and second rings 66, 67 will have offset centers, each of the respective centers being defined by each respective inner rim of the first and second rings 66, 67. The amount of offset depends on factors such as: the vertical distance between inside surfaces of each of the rings 66, 67; the cross-sectional thickness of each of the rings 66, 67; and the diameter of the float 44. For example, in the FIG. 3 embodiment, the vertical distance between rings 66, 67 is about 1.03 inches (about 26.2 mm). The cross-sectional thickness of each of the rings 66, 67 is about 0.06 inches (about 1.5 mm). The diameter of the float 44 is about 2.5 inches (about 63.5 mm). For these dimensions, an offset between rings 66, 67 is, for example, about 0.10 inch (about 2.5 mm).

Other dimensions which may be used for constructions herein are described below in Table 1.

TABLE 1

| Vertical Distance | Ring Thickness | Float Diameter | Offset | Ring Inside Diameter |
|---|---|---|---|---|
| at least 1.03 in. (about 26.2 mm) | 0.06 in. (about 1.5 mm) | 2.500 in. (about 63.5 mm) | 0.10 in. (about 2.5 mm) | 2.505 in. (about 63.6 mm) |
| at least 1.19 in. (about 30.2 mm) | 0.06 in. (about 1.5 mm) | 2.500 in (about 63.5 mm) | 0.38 in. (about 9.5 mm) | 2.505 in. (about 63.6 mm) |
| at least 1.03 in. (about 26.2 mm) | 0.06 in. (about 1.5 mm) | 2.750 in. (about 69.9 mm) | 0.20 in. (about 5.1 mm) | 2.755 in. (about 70 mm) |
| at least 1.19 in. (about 30.2 mm) | 0.06 in. (about 1.5 mm) | 2.250 in. (about 57.2 mm) | 0.38 in. (about 9.7 mm) | 2.255 in. (about 57.3 mm) |
| at least 0.90 in. (about 22.9 mm) | 0.06 in. (about 1.5 mm) | 2.250 in. (about 57.2 mm) | 0.20 in. (about 5.1 mm) | 2.255 in. (about 57.3 mm) |

One preferred relationship is between the diameter of the float 44 and the inside diameter of the rings 66, 67. It has been found that if the inside diameter of the rings 66, 67 is, for example, about 0.005 in. (about 0.13 mm) greater than the diameter of the float 44, it leads to a convenient, preferred arrangement.

A tortuous, obstructed path for float 44 is created by arrangements of the rings 66, 67 as described herein. For example, if vibration causes float 44 to move from its resting position shown in FIG. 3 to pass through first ring 66, it bumps into the circumferential band 75 of second ring 67. This prevents float 44 from traveling any further toward the valve seat 47. However, if liquid begins to fill housing construction 42, float 44 will float on the surface of the liquid and rise as the level rises, where it will easily travel between first and second rings 66, 67.

While the embodiment of FIG. 3 shows rings 66, 67 radially lining the cylindrical tube of wall member 54, it should be understood that other operative embodiments are contemplated. For example, first and second rings 66, 67 need not be complete rings. Instead, they may be a series of projections or studs, non-joined to one another.

In certain example constructions, housing construction 42 comprises a unitary, molded construction made of plastic. Rings 66, 67 are also plastic, and are secured to the interior of wall member 54 through standard techniques, such as adhesive bonding. Rings 66, 67 may also be molded as part of the housing construction 42.

In other embodiments, housing construction 42 may be a wire cage. The wire cage can include wire rings in place of the rings 66 and 67. The wire cage is bent, such that the rings are not coaxially aligned. That is, the cage is bent in a non-linear or curved configuration. This provides an offset between the rings. If vibration or bounce occurs, the float will not have a clear path to its valve seat, due to the curved configuration of the wire cage and the placement of the wire rings. In another embodiment, instead of rings 66, 67, horizontal partitions with offset holes can be used.

Turning again to the embodiment shown in FIG. 3, one example valve seat 47 is illustrated as including a flexible seal member 76. For example, seal member 76 comprises a circular ring with opposite first and second surfaces 77, 78. In FIG. 3, note that seal member 76 is spaced from the wall of the outlet tube construction 29 to form a gap 79 therebetween. The gap 79 allows the seal member 76 to flex within gap 79 when float 44 engages it. For example, when float 44 engages seal member 76, a seal is formed between the seal member 76 and the float 44 to prohibit the passage of fluid therebetween. Further, the seal member 76 is flexible such that it helps to form the seal with the float 44, yet it prevents float 44 from sticking in the seal member 76. In certain example arrangements, the seal member 76 can have a thickness of about 0.06 inches. (about 1.5 mm), and an inner diameter for example the same as the inner diameter of the tube construction 29. In one example arrangement, the inner diameter of the seal member 76 is about 2.38 inches (about 6 cm). For example, the seal member 76 and the outlet tube construction 29 form gap 79 having a height of about 0.06 inches (about 1.5 mm).

In operation, during normal conditions when air cleaner 20 is above any level of liquid, float 44 is held within float support region 50. Air is being filtered through air cleaner 20 by passing from inlet 22, through filter element 24, into outlet assembly 27, through inlet port 46, out through outlet tube 23, and into an engine. As the vehicle, and, therefore the air cleaner 20, move, the air cleaner 20 may be subject to significant vibration due to bumps in the road, uneven road conditions, etc. As air cleaner 20 vibrates or bounces, float 44 is maintained within float support region 50 and away from valve seat 47, due to rings 66, 67. That is, float 44 may be jarred from, jiggled, or forced away from engaging wall 32 and wall 54, but bump up against ring 66 and then bounce to bump up against ring 67. Due to the relative positioning of rings 66 and 67 and their orientation with respect to each other, float 44 is impeded from advancing further toward valve seat 47. If the vehicle is driven into deep liquid or water to a level which is above the inlet 22 of housing 21, the liquid enters inlet 22, travels through filter element, and eventually reaches outlet assembly 27. As the level of liquid begins to rise within outlet assembly 27 and valve assembly 40, float 44 floats on the surface of the water or liquid. As the liquid rises, float 44 floats on the surface of the liquid through the ring 66 and the ring 67, until it eventually sits within valve seat 47 to block the air outlet 23. As the liquid level gets the float 44 close to the outlet 23, air flow forces drag, and/or vacuum facilitate the float 44 seating quickly in the valve seat 47 to block the outlet 23. When float 44 blocks air outlet 23, the air intake to the engine is cut off, and the engine shuts down. Float 44 also prevents the liquid or water from being passed or sucked into the engine. Float 44 stays positioned in valve seat 47 until the liquid level falls, even if the engine is turned off. As the liquid level falls, for example, if the vehicle is pushed out of the region of high water, the liquid is allowed to drain through aperture 25. The liquid does not become trapped within float support member 50, because of drain aperture 55. Therefore, the liquid or water is allowed to eventually drain through aperture 25. Aperture 25 is generally the lowest part of the air cleaner 20, when oriented on a vehicle. As the liquid level falls, the float 44 falls from within valve seat 47. This permits the engine to again be started, where air is allowed to flow through the air cleaner and out through the outlet tube 23 into the engine.

Figure 6:
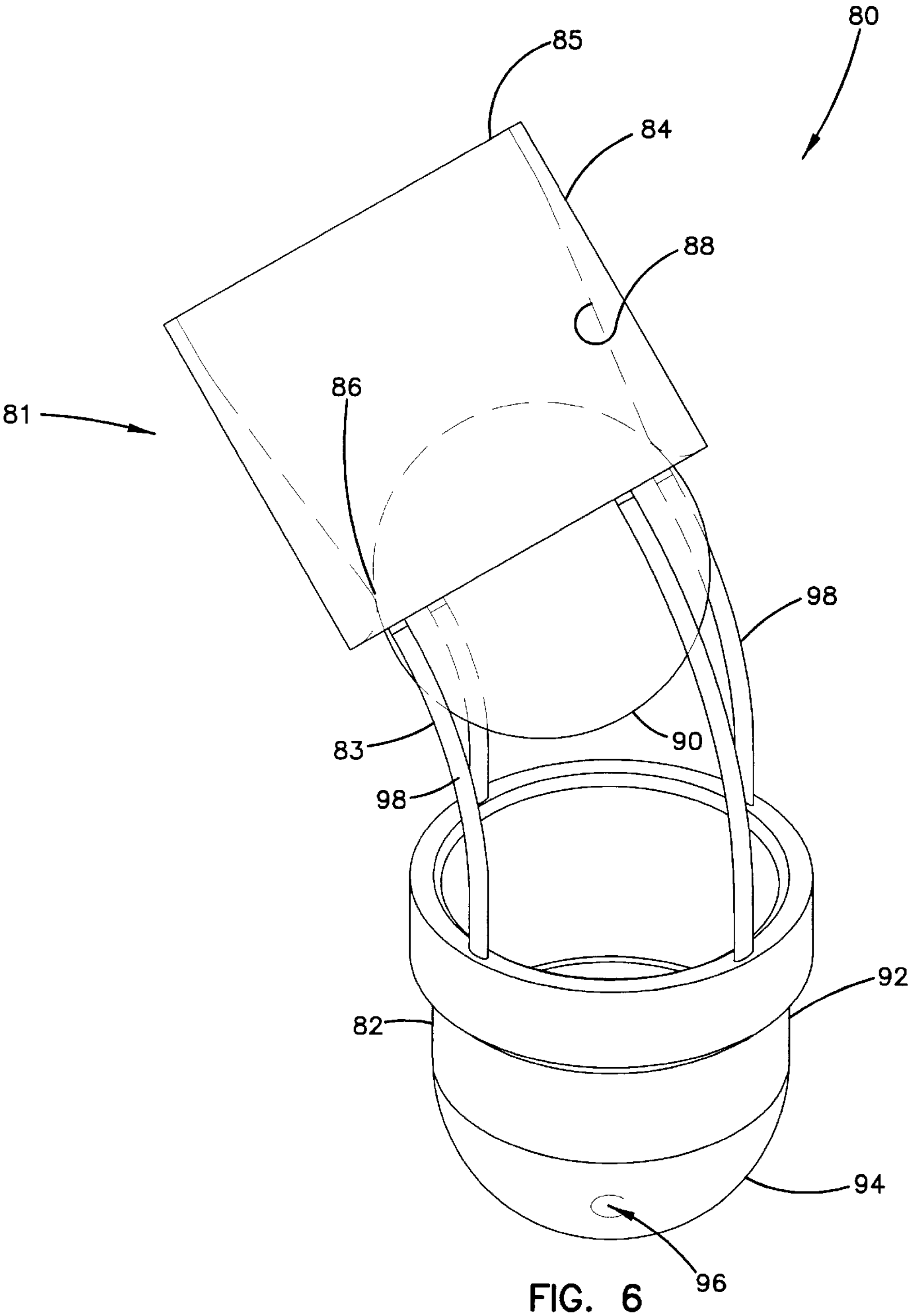
FIG. 6 is a schematic, perspective view of a second embodiment of a valve assembly usable in the air cleaner housing of FIG. 1, in accordance with principles of the present invention.

Attention is now directed to FIG. 6. In FIG. 6, a second embodiment of a valve assembly is depicted generally at 80. In FIG. 6, the example valve assembly 80 includes a housing 81. Housing 81 includes a float support region 82, a cage region 83 and an outlet tube 84. Outlet tube 84 defines an outlet aperture 85 and a valve seat 86.

As can be seen in FIG. 6, the example outlet tube 84 includes an inner wall 88 tapered between a region of largest diameter at outlet aperture 85 to a region of smallest diameter at valve seat 86. A spherical float 90 is shown seated within valve seat 86. FIG. 6 depicts float 90 in a position when liquid has filled the air cleaner housing, including the outlet assembly 27, to cause float 90 to become removably lodged in or seated within valve seat 86 and block fluid flow through outlet aperture 85.

The valve seat 86 can include a flexible seal member, analogous to that described at 76 in conjunction with FIG. 3.

Still in reference to FIG. 6, float support region 82 comprises a cup 92, for example. The example cup 92 shown is shaped and configured to snugly conform to the shape of spherical float 90. Specifically, the particular cup 92 shown has a cross section which is generally U-shaped. For example, it includes a hemispherically shaped portion 94. Hemispherically shaped portion 94 defines, at its lowest portion, an aperture 96.

When float 90 is in its resting position, i.e. during normal engine operation and location above liquid levels, float 90 rests within cup 92 and against hemispherically shaped portion 94. If liquid begins to fill housing 81, float 90 will float at the surface of the liquid level out of cup 92 and be guided by cage region 83 into valve seat 86.

The example cage region 83 functions to allow for the free passage of air through cage region 83, while maintaining float 90 within its path between cup 92 and valve seat 86. Cage region 83, in this embodiment, comprises a plurality of elongate members 98 in extension between cup 92 and outlet tube 84. In this example, there are four members 98. In one example, extension members 98 are constructed of wire.

Aperture 96 operates as a drainage hole, in order to help drain liquid from housing 81 after liquid has entered housing 81.

Valve housing 81 is constructed and arranged to inhibit movement of float 90 along its float path to the valve seat 86, unless liquid fills the housing 81. In the embodiment of FIG. 3, the example valve housing construction 42 included projection members or ring constructions. In the FIG. 6 embodiment, float 90 is restrained by suction or vacuum pressure.

Specifically, the relationship between the inner diameter of the cup 92, diameter of the float 90, axial length of the cup 92 and weight of the float 90 are selected such that pneumatic dampening occurs.

In general, if the float 90 is shook or vibrated, the float 90 will move from the portion 94 within the cup 92. As the float 90 moves axially along the cup 92, the volume between the float 90 and the portion 94 increases. This increase in volume causes a pressure drop in the volume between the float 90 and portion 94. The drop in pressure results in a pressure differential across the float 90 between the volume inside of the cup 94 (i.e., between the portion 94 and the float 90) and the volume outside of the cup 92. Specifically, the pressure within the cup 92 is less than the pressure outside of the cup 92. This region of decreased pressure acts as vacuum to suck or draw the float 90 back toward portion 94. In other words, as the float 90 moves away from portion 94, the increase in volume (and thus the decrease in pressure) occurs faster than air can get into the volume between the float 90 and portion 94, which results in a volume of decreased pressure below the float 90 (within cup 92) as compared to above the float 90 (outside of cup 92). The net decrease in pressure results in a vacuum, which acts to restrict movement of the float 90 toward the valve seat 86.

Example constructions include the inner diameter of the cup being about 1.01–6.01 inches (about 25.7–152.7 mm), for example, about 2.25–2.75 inches (about 57.2–69.9 mm), and for example about 2.4 inches (about 61.0 mm). The outer diameter of float 90 is, for example, about 1–6 inches (about 25.4–152.4 mm), for example about 2.24–2.74 inches (about 56.9–69.6 mm), and for example about 2.39 inches (about 60.7 mm). Therefore, the ratio of the inner diameter of cup 92 to outer diameter of float 90 is about 1.004. That is, for example, the inner diameter of the cup 92 is no more than about 0.4% larger than the outer diameter of the float 90.

In certain constructions, cup 92 has an axial length of about 1.55–6.05 inches (about 39.4–153.7 mm), for example, about 2.55–3.05 inches (about 64.8–77.5 mm), and, for example, about 2.7 inches (about 68.6 mm). Typically, float 90 is constructed of polypropylene material, weighs about 30 grams, and has a density less than one gram per cubic centimeter. Drainage aperture 96 typically has a diameter of, for example, about 0.06–0.12 inches (about 1.5–3.0 mm), and, for example, about 0.09 inches (about 2.3 mm). Thus, the ratio of the diameter of the drainage aperture 96 to the inner diameter of the cup 92 is about 0.038. That is, for example, the inner diameter of the cup 92 is about 26.67 times larger than the diameter of the drainage aperture 96. Drainage aperture 96 cannot be made too large, or else it will destroy the suction or vacuum pressure induced between the wall of cup 92 and float 90. That is, it will allow air to rush into the volume of the cup 92 below the float 90 as fast as the volume below the float 90 increases.

In certain constructions, the axial length of the cup 92 and the outer diameter of the float 90 are selected for certain, preferred applications. In one example construction, the axial length of the cup 92 is from ½ to 5 times the length of the outer diameter of the float 90. In other words, the ratio of the axial length of the float 90 to the outer diameter of the float 90 is between 1:2 and 5:1. In one example construction, the ratio is 2.7:1.

In operation, during normal conditions when air cleaner 20 is above any level of liquid, float 90 is held within float support region 82 within cup 92. Air is being filtered through air cleaner 20 by passing from inlet 22, through filter element 24, into outlet assembly 27, through cage region 83, out through outlet aperture 85, and into an engine. As the vehicle, and therefore the air cleaner 20, move, the air cleaner 20 may be subject to significant vibration due to bumps in the road, uneven road conditions, etc. As air cleaner 20 vibrates or bounces, float 90 is maintained within cup 92, due to pneumatic dampening. That is, float 90 may be jarred from or forced away from inner wall of hemispherically shaped portion 94, but due to the dimensional relationship between float 90 and cup 92, suction is induced which keeps float 90 within cup 92 and away from valve seat 86. If the vehicle is driven into deep liquid or water to a level which is above the inlet 22 of housing 21, the liquid enters inlet 22, travels through filter element 24, and eventually reaches outlet assembly 27. As the level of liquid begins to rise within outlet assembly 27 and valve assembly 80, float 90 floats on the surface of the liquid. As the liquid rises, float 90 rises out of cup 92, and, as the liquid level gets the float 90 close to the outlet 85, air flow forces, drag, and/or vacuum facilitate the float 90 seating quickly to rest in valve seat 86 to block the outlet 85. No vacuum or suction is induced between float 90 and cup 92 because of the float buoyancy. When float 90 blocks air outlet aperture 85, the air intake to the engine is cut off, and the engine shuts down. Float 90 also prevents the liquid or water from being passed or sucked into the engine. As the liquid level falls, for example, if the vehicle is pushed out of the region of high water, the liquid is allowed to drain through aperture 96 and aperture 25. As the liquid level falls, the float 90 falls from or becomes unseated from valve seat 86. This permits the engine to again be started, where air is allowed to flow through the air cleaner and out through outlet aperture 85 into the engine.

Figure 7:
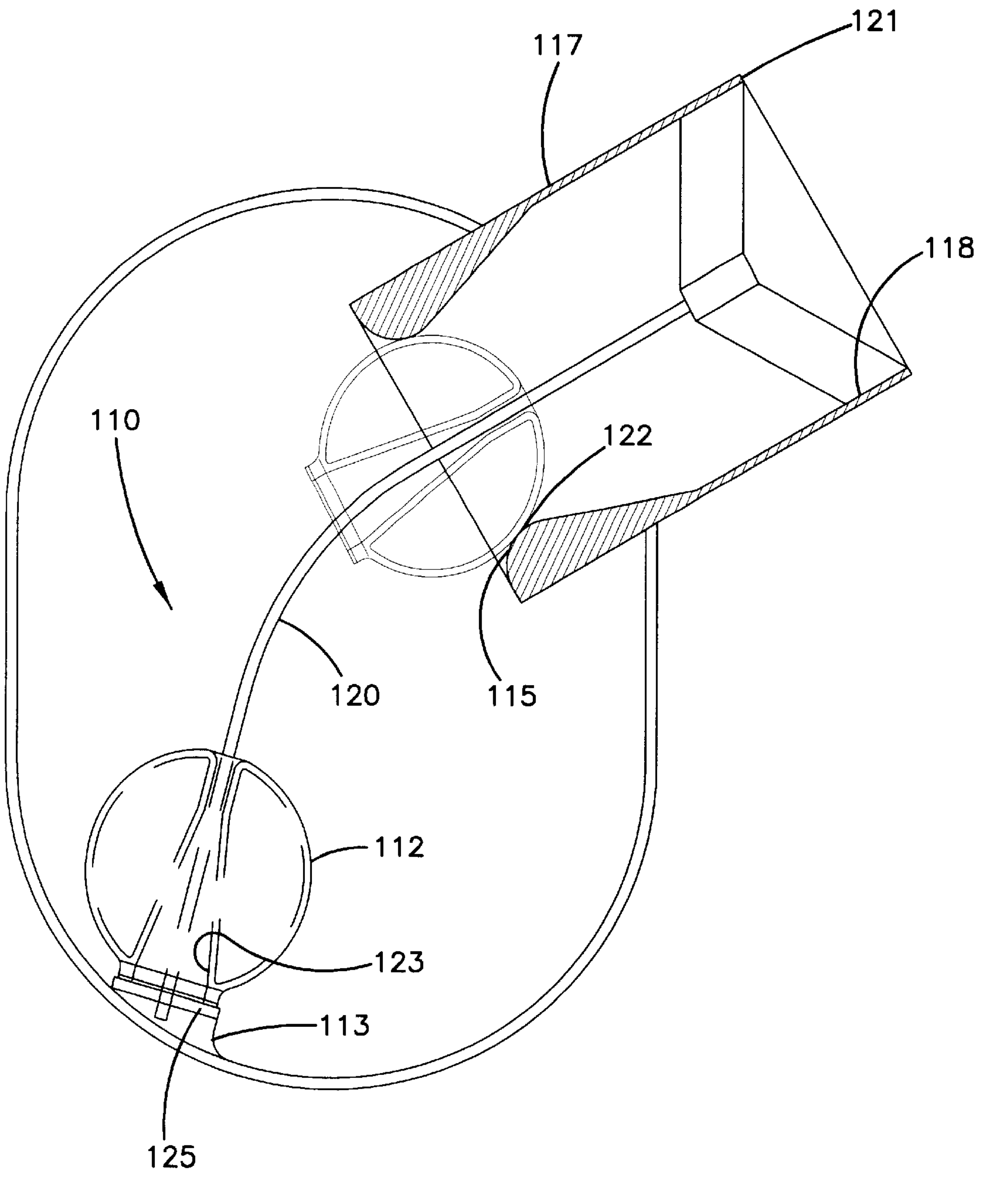
FIG. 7 is a schematic, front side elevational view of a third embodiment of a valve assembly usable in an air cleaner housing depicted in FIG. 1, in accordance with principles of the present invention.

Turning now to FIG. 7, another embodiment of a valve assembly is shown generally at 110. In FIG. 7. valve assembly 110 is, in the example shown, constructed within an outlet assembly, such as outlet assembly 27 of air cleaner housing 21. A float 112 moves between a float support region 113 and a valve seat 115. When float 112 is positioned within valve seat 115, (shown in phantom in FIG. 7), float 112 blocks fluid flow through outlet tube construction 117 and outlet aperture 118. As with the other embodiments described above, when float 112 is seated within valve seat 115, it cuts off air flow into the engine, which causes the engine to shut down. This also prevents the intake of water or liquid into the engine.

Also shown in FIG. 7 is a guidewire 120. For example, guidewire 120 is oriented between the float support region 113 and the end 121 of outlet tube construction 117. As such, guidewire 120 passes through the outlet port 122 and through the valve seat 115, for example. The preferred float 112 includes an open-slotted portion 123 to slideably accommodate guidewire 120. As such, guidewire 120 functions to guide float 112 between its resting position at float support region 113 along a path to valve seat 115.

Note the shape of guidewire 120. It is a nonlinear, curved shape. As such, it gives float 112 a nonlinear or curved float path. This nonlinear float path helps to prevent float 112 from being seated within valve seat 115 due only to vibration or shaking. As with the FIG. 3 embodiment, this FIG. 7 embodiment can include a seal ring or member at valve seat 115, analogous to seal member 76 in FIG. 3.

Valve assembly 110 is constructed and arranged to inhibit movement of float 112 along its float path to the valve seat 115, unless a selected liquid volume within the housing is attained. As embodied herein, valve assembly 110 includes a magnet 125 located in the float support region 113. Float 112 is constructed of a material attracted to magnet 125, for example, a metallic material. The attractive force between the magnet 125 and the float 112 is strong enough to keep float 112 generally in its resting position against float support region 113 when the air cleaner is operated during normal conditions and above a level of liquid or water. The attractive force of magnet 125 is such that when liquid begins to fill the outlet assembly 27, float 112 is dislodged from magnet 125 and allowed to rise with the level of liquid. Typically, attractive forces of magnets and floats are slightly less than the buoyancy of the float 112. One useful attractive force between the magnet and the float 112 is about 70–90 grams, for a float with a weight of 30 grams and a diameter of 2.5 in.

Turning now to FIGS. 8–11, alternative shapes for float 112 are illustrated. The floats in FIGS. 8–11 are more compact than the spherical design of the embodiments described above and may be easier to fit in the desired air cleaner to be used. The shapes in FIGS. 8–11 are also inclined to minimize the forces of air flow being drawn through the air cleaner. As such, the shapes of FIGS. 8–11, can prevent the floats from being drawn to the valve seat merely by high velocity flow of air through the air cleaner. Note that in each of the float embodiments of FIGS. 8–11, a bottom surface is flat. Also, each of the float designs of FIGS. 8–11 include circular tops for engagement with the valve seat. This is to ensure that float orientation within the valve seat is irrelevant.

Figure 8:
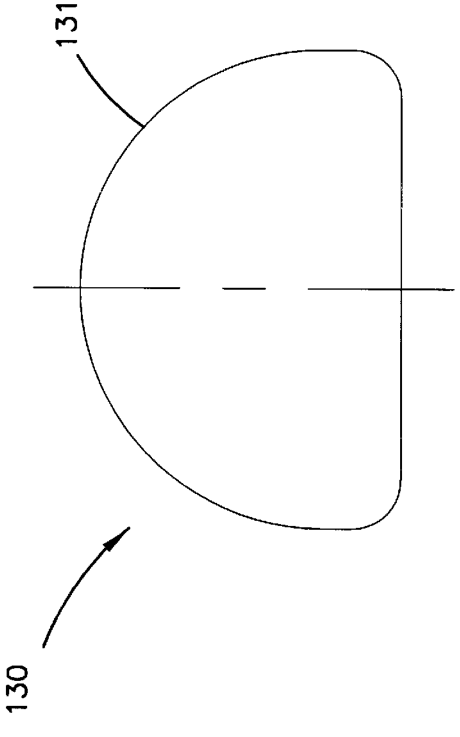
FIG. 8 is a schematic, side elevational view of an alternative embodiment of a float construction, usable in the valve assemblies in accordance with principles of the present invention.

In FIG. 8, a float 130 having a spherical-shaped top 131 for engaging the valve seat is shown.

Figure 9:
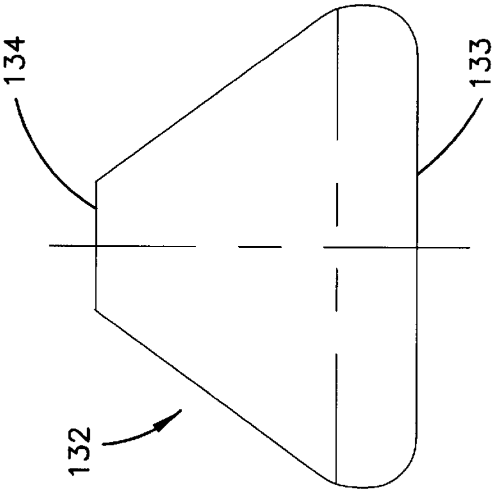
FIG. 9 is a schematic, side elevational view of another alternative embodiment of a float construction usable in valve assemblies, in accordance with principles of the present invention.

In FIG. 9, a truncated or oblated cone-shaped float 132 is shown. Float 132 includes a flat surface at both end 133, which does not engage the valve seat, and end 134, which does engage the valve seat.

Figure 10:
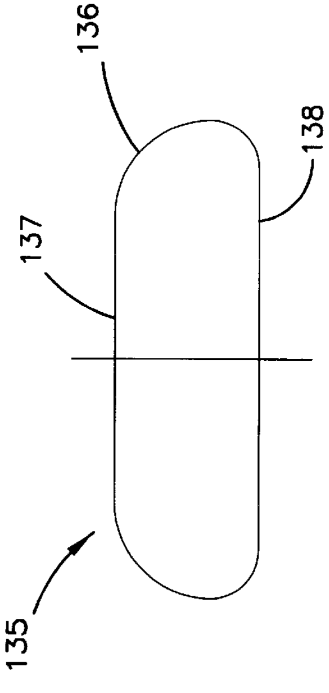
FIG. 10 is a schematic, side elevational view of another alternative embodiment of a float construction, usable in valve assemblies, in accordance with principles of the present invention.
Figure 11:
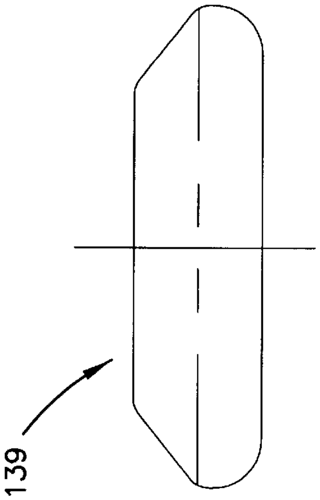
FIG. 11 is a schematic, side elevational view of another alternative embodiment of a float construction, usable in valve assemblies, in accordance with principles of the present invention.

FIGS. 10 and 11 illustrate floats shaped with low profiles. In FIG. 10, float 135 has a partial spherical-shaped top. This can be seen at rounded curved surface 136. Both the end 137, which engages the valve seat, and the end 138, which is opposite to end 137, are flat.

In FIG. 11, a truncated cone-shaped float 139 is illustrated. Float 139 is analogous to float 132 (see FIG. 9), but is shorter.

Figure 12A:
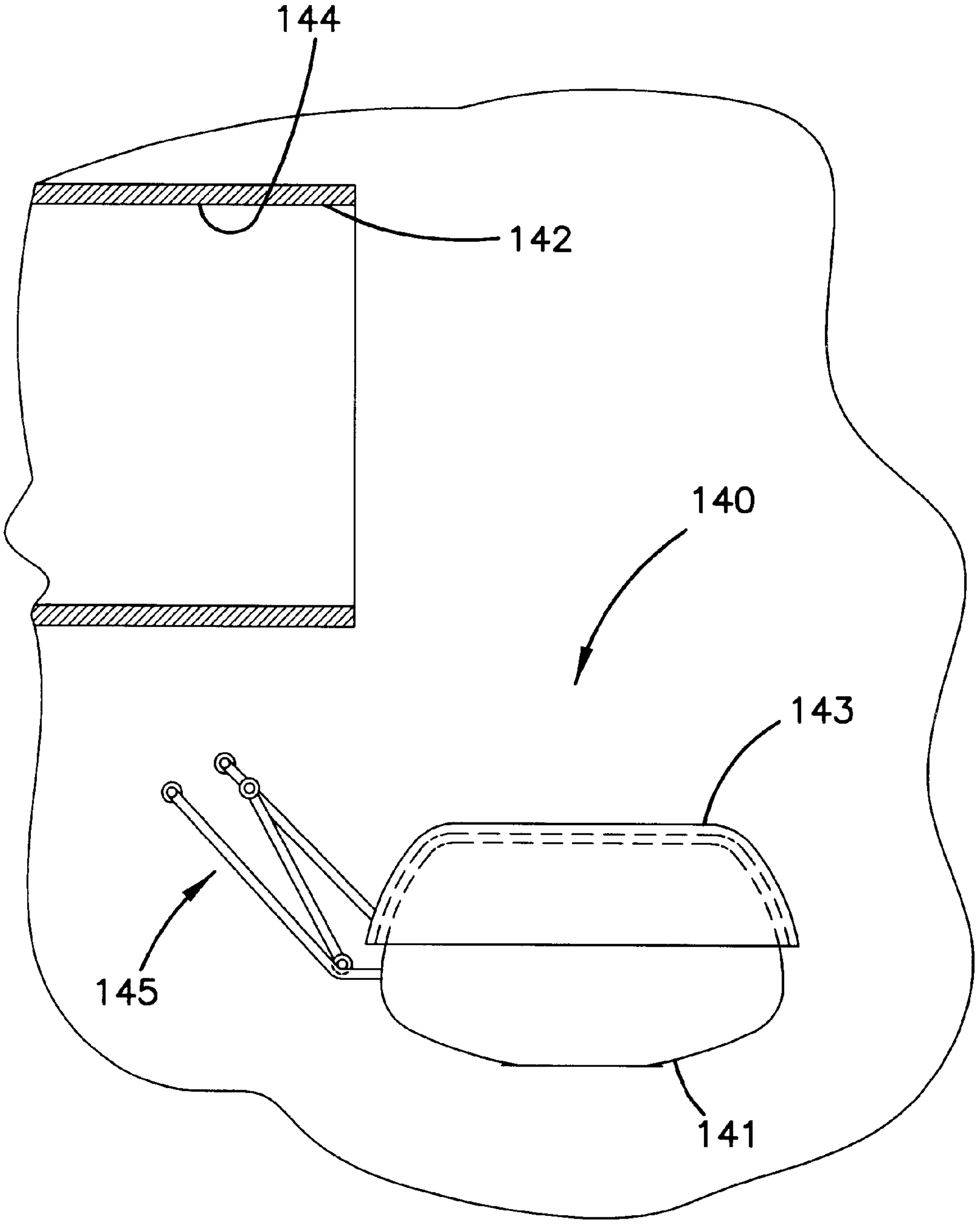
FIG. 12A is a schematic, partial cross-sectional view of another embodiment of a valve assembly usable with the air cleaner housing depicted in FIG. 1, depicted in an open position, in accordance with principles of the present invention.
Figure 12B:
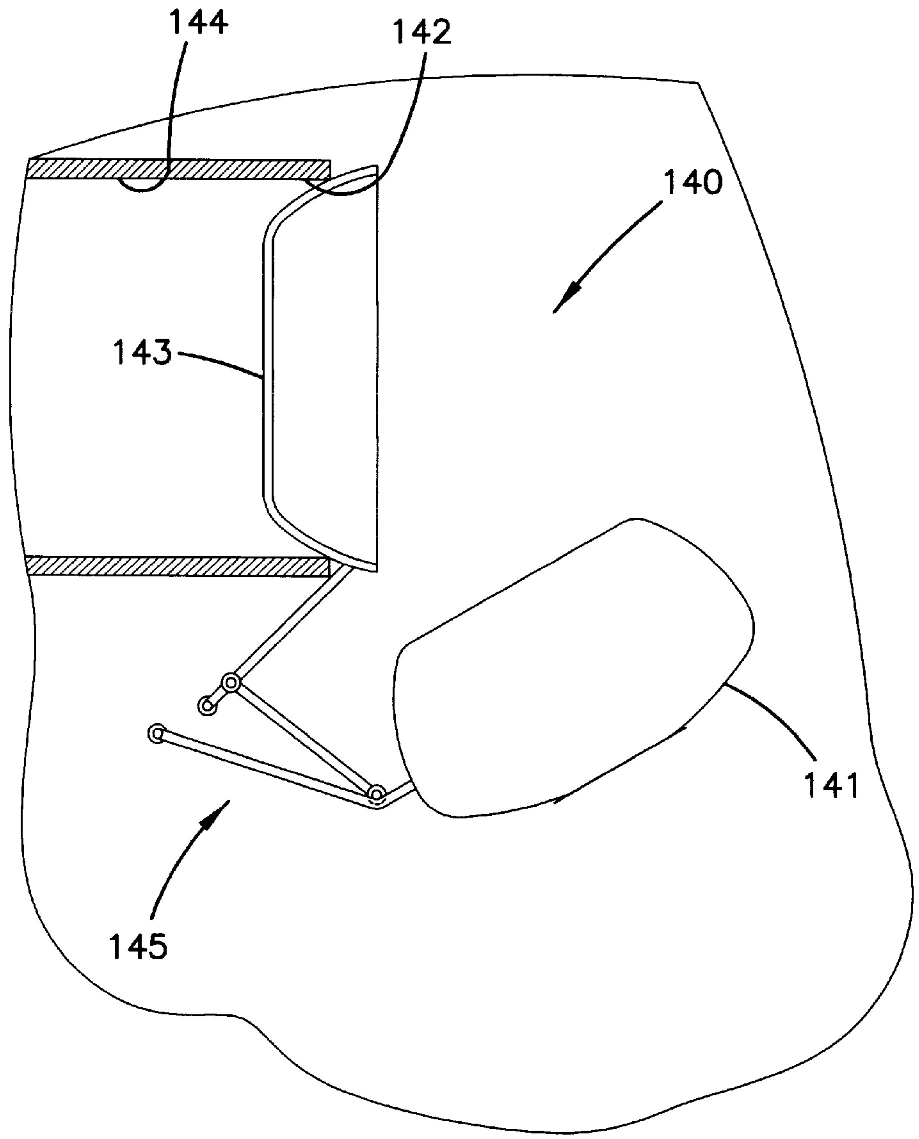
FIG. 12B is a schematic, partial cross-sectional view of the valve assembly of FIG. 12A depicted in a closed position, in accordance with principles of the present invention.

Attention is now directed to FIGS. 12A and 12B. In FIGS. 12A and 12B, another alternative valve assembly is shown generally at 140. Valve assembly 140 includes a float 141 and a valve seat 142. Float 141, for example, includes an outlet sealing disk 143. Outlet sealing disk 143 will serve to seat within valve seat 142 and block air flow and liquid intake through outlet tube 144.

Float 141 is, for example, mounted to a hinged arm or linkage 145. Linkage 145 locates the float 141 in its resting position or stored position on the bottom of the housing (FIG. 12A) and guides sealing disk 143 into the opening of the outlet tube 144 or valve seat 142 when liquid enters the region. Specifically, as liquid enters the region, float 141 starts to rise. As float 141 rises, it pushes the linkage 145. As shown in FIG. 12B, the linkage 145 acts on and causes the sealing disk 143 to form a seal in the valve seat 142. In this manner, the outlet tube 144 is sealed closed prior to the entire housing becoming full of liquid (FIG. 12B). As the liquid in the housing starts to decrease, the float 141 drops. The drop of the float 141 pulls the linkage 145 downwardly, which pulls the sealing disk 143 out from within valve seat 142 and back to its resting position oriented over float 141 (FIG. 12A). A magnet, such as that illustrated in FIG. 7, may be utilized to maintain the float 141 in its stored or resting position.

Figure 13A:
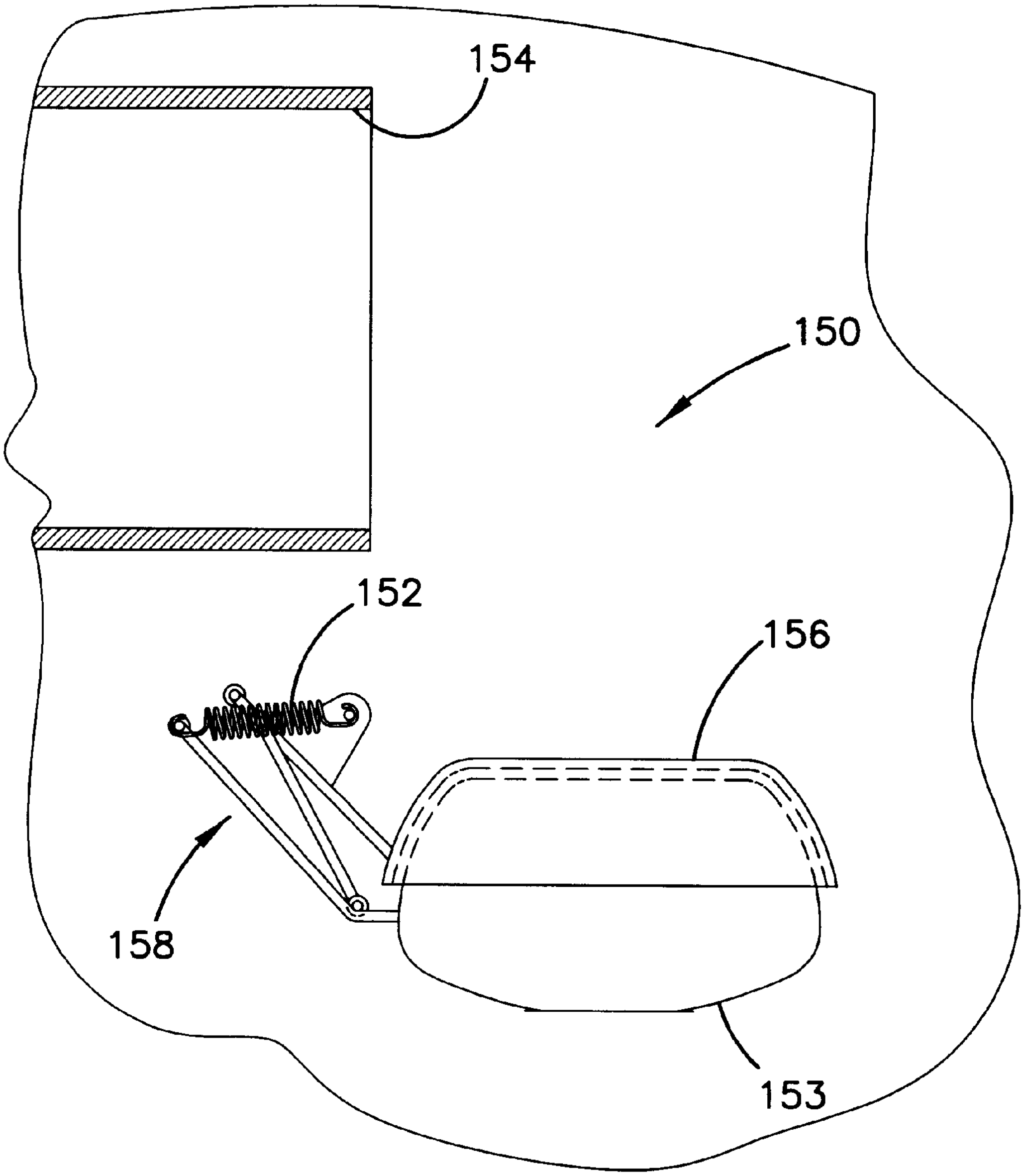
FIG. 13A is a schematic, partial cross-sectional view of another embodiment of a valve assembly usable with the air cleaner housing depicted in FIG. 1, depicted in a closed position, in accordance with principles of the present invention.
Figure 13B:
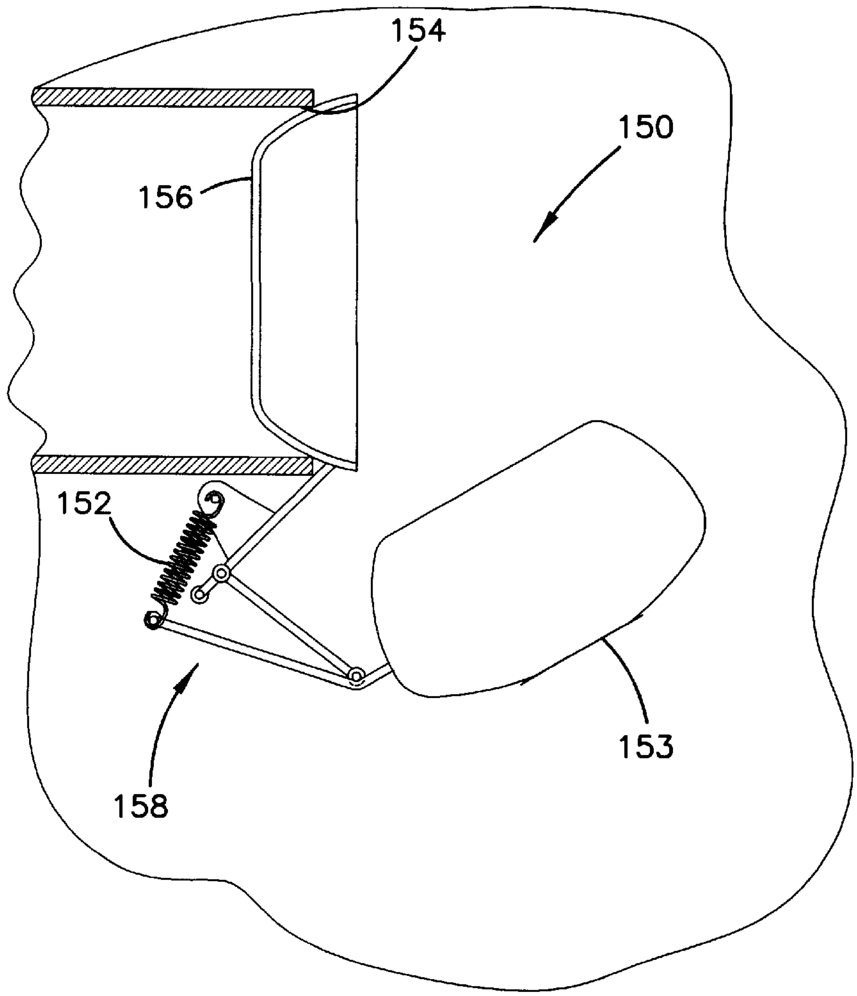
FIG. 13B is a schematic, partial cross-sectional view of the valve assembly of FIG. 13A depicted in a closed position, in accordance with principles of the present invention.

FIGS. 13A and 13B show another embodiment of a valve assembly 150. Valve assembly 150 is analogous to valve assembly 140. Valve assembly 150, for example, includes a float 153 and a valve seat 154. The example float 153 includes an outlet sealing disk 156. Outlet sealing disk 156 is analogous to sealing disk 143 (FIGS. 12A and 12B). A linkage 158, for example analogous to linkage 145, locates the float 153 in its resting position on the bottom of the housing (FIG. 13A) and guides sealing disk 156 to the valve seat 154. An extension spring 152, for example, cooperates with linkage 158 to provide a more positive seal. Specifically, in the example illustrated, spring 152 acts as an "over-center" spring. In the down position (FIG. 13A), the spring 152 holds the float 153 down on the bottom of the housing. As liquid enters the region, the float 153 rises. As the float 153 rises, it acts on linkage 158, which pushes on sealing disk 156. When the spring 152 is moved over-center, it pulls the sealing disk 156 into the valve seat 154 (FIG. 13B). To operate, the density of the float 153 is greater than the strength of the spring 152.

Again, as with the FIG. 12A, 12B embodiment and FIG. 7 embodiment, a magnet may be used to inhibit movement of the float 153 from traveling to the valve seat 154, unless water is in the region.

Figure 14:
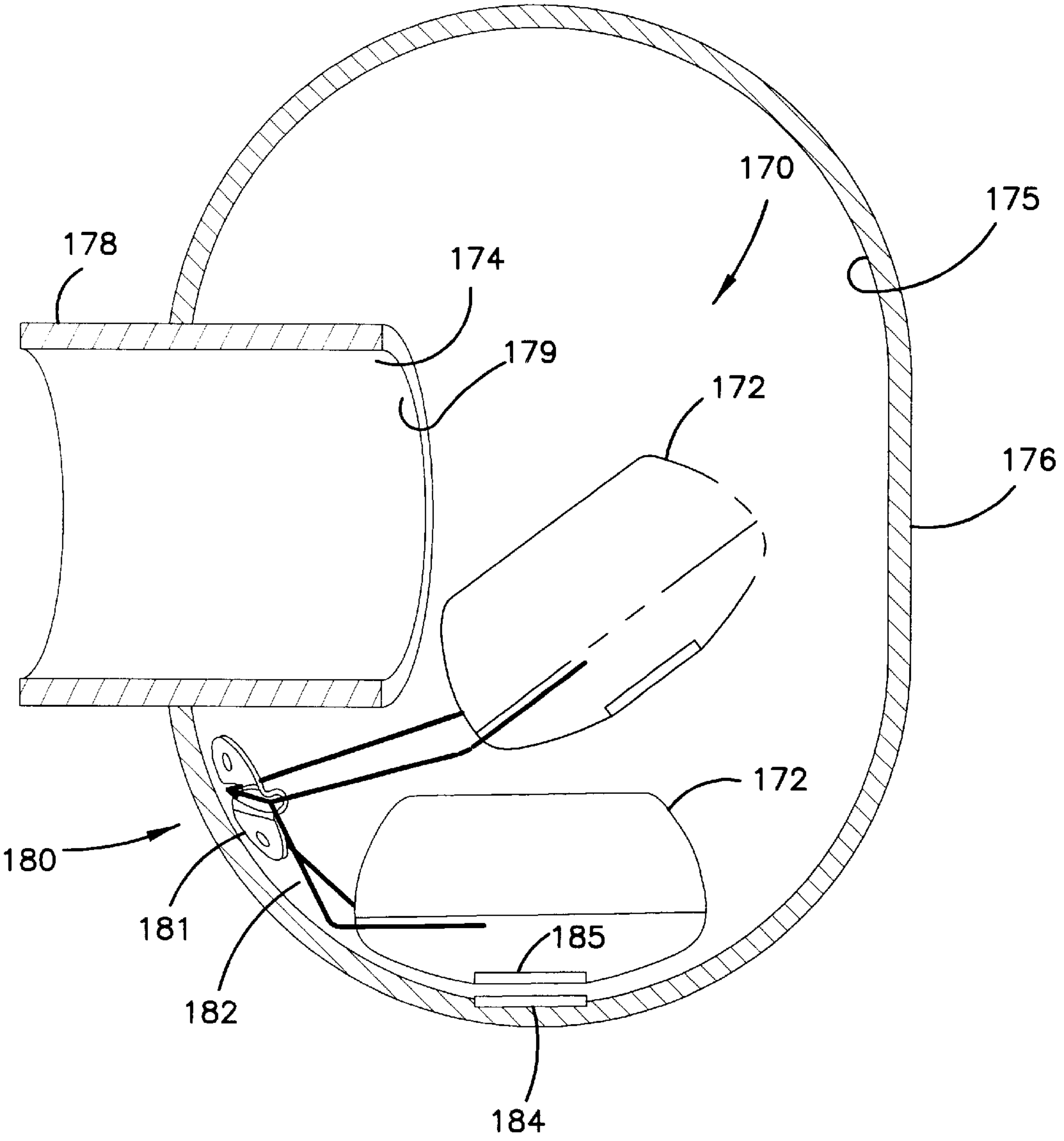
FIG. 14 is a schematic, partial cross-sectional view of another embodiment of a valve assembly usable with the air cleaner housing depicted in FIG. 1, in accordance with principles of the present invention.

FIG. 14 shows another embodiment of a valve assembly 170. The example valve assembly 170 includes a float 172 and a valve seat 174. Float 172 is, for example, shaped and configured relative to valve seat 174 to fit within valve seat 174 and block fluid flow communication (i.e., either liquid flow or gas flow) between the volume 175 of outlet assembly housing 176 and outlet tube 178.

Valve assembly 170 includes structure to guide the float 172 between a first position where the float 172 is positioned within the float support region of the outlet assembly housing 176 and a second position where the float 172 is positioned within the valve seat 174 to obstruct the outlet port 179. While a variety of embodiments have been described thus far and are contemplated herein, in this particular embodiment, the structure, for example, includes a hinge and arm assembly 180. The example hinge and arm assembly 180 comprises a hinge or plate 181 secured to outlet assembly housing 176. Arms 182 are, for example, pivotally secured to hinge plate 181. Arms 182 operate to secure the float 172 to the hinge plate 181, and move the float 172 between its first and second positions. The phantom lines illustrate the float 172 moving from its first position (where it is resting against the outlet assembly housing 176) toward the second position (where it is resting within the valve seat 174).

An optional magnet 184 and metal plate 185 may be used to help inhibit movement of the float 172 along its float path to the second position, unless liquid starts to fill the volume 175. If liquid does start to fill the volume 175, the buoyancy of the float 172 will be sufficient to overcome the force between the magnet 184 and metal plate 185. The float 172 will move along its float path toward the valve seat 174, guided by the hinge and arm assembly 180. As can be seen in phantom, the arms 182 permit the float 172 to rotate into a proper orientation to block the outlet port 179.

Figure 15:
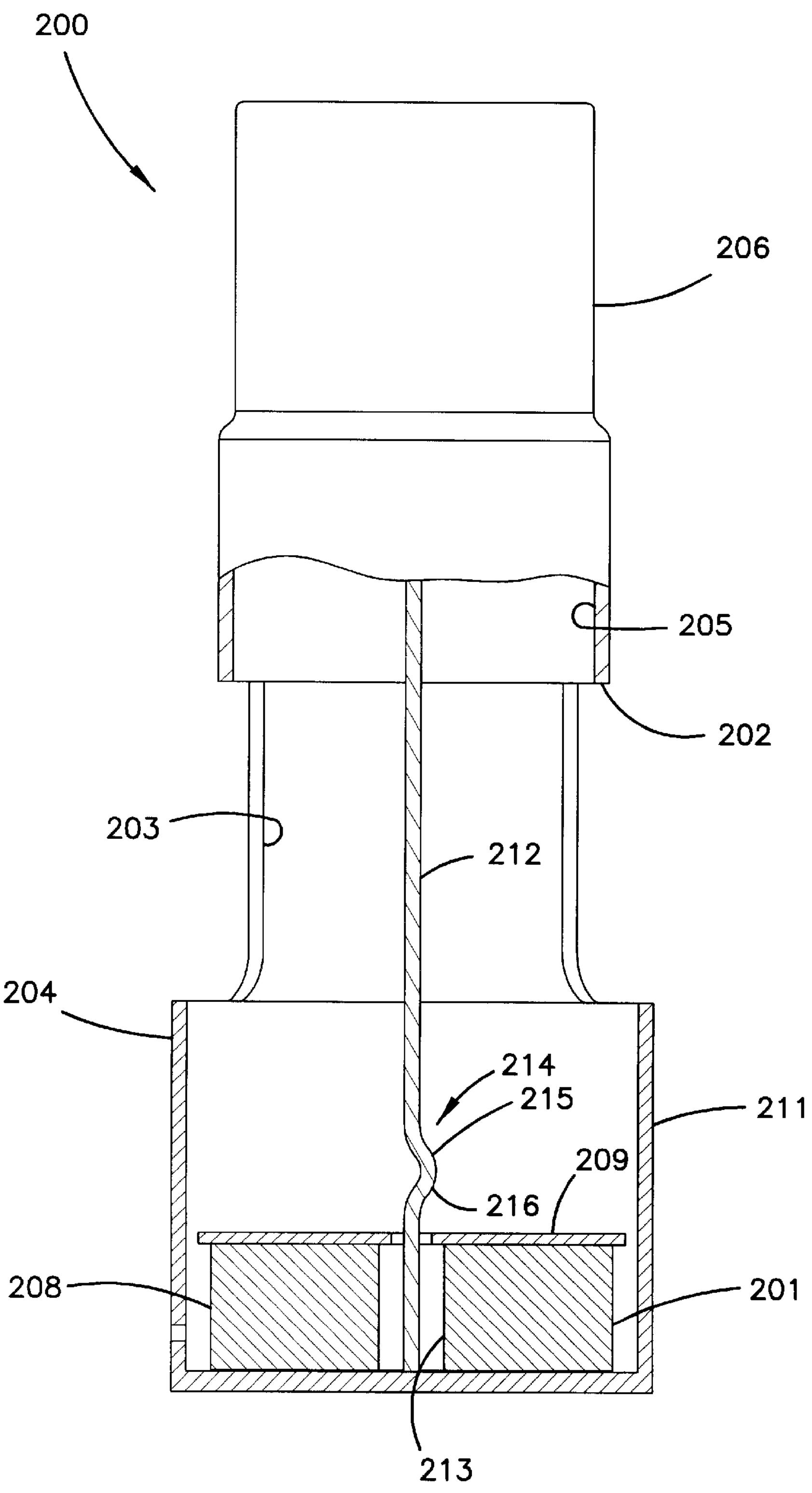
FIG. 15 is a schematic, partially cross-sectional, partially broken away view of an alternative embodiment of a valve assembly, similar to that depicted in FIG. 4, and showing the valve assembly in an open orientation, in accordance with principles of the present invention.

FIG. 15 shows another embodiment of a valve assembly 200. The example valve assembly 200 includes a float 201 and valve seat 202. Float 201 is, for example, shaped and configured relative to valve seat 202 to block fluid flow communication (i.e., liquid or gas flow) between volume 203 of outlet assembly housing 204 and volume 205 within outlet tube 206.

In the example shown, float 201 is cylindrical in shape with a circular cross section. The particular preferred float 201 shown in FIG. 15 includes a support structure 208 and a sealing structure 209. When sealing structure 209 engages valve seat 202, it forms a seal 210 (FIG. 16) therebetween. The seal 210 blocks fluid flow into the volume 205 of the outlet tube 206.

Referring again to FIG. 15, valve assembly 200 includes, for example, structure to guide the float 201 between open positions and a closed or sealed position. In the first or resting or open positions, the float 201 is not abutting or engaging the valve seat 202. Typically, the float 201 will be positioned within a float support region 211 of the outlet assembly housing 204 when the valve assembly 200 is in open positions. While a variety of embodiments have been described thus far and are contemplated herein, in this specific embodiment, the structure for example includes a guidewire 212. Guidewire 212 creates a torturous path for the float 201 between its resting position, FIG. 15, and its closed or sealed position, FIG. 16. Specifically, guidewire 212 includes a non-linear extension shown generally at 214. Non-linear extension 214 operates to introduce obstruction to the path between the resting position of float 201 and the closed or sealed position of float 201. More specifically, non-linear extension 214 for example comprises bend or kink or projection 215. Projection 215 resembles a smooth wave 216, in the cross-sectional view shown in FIG. 15.

Figure 16:
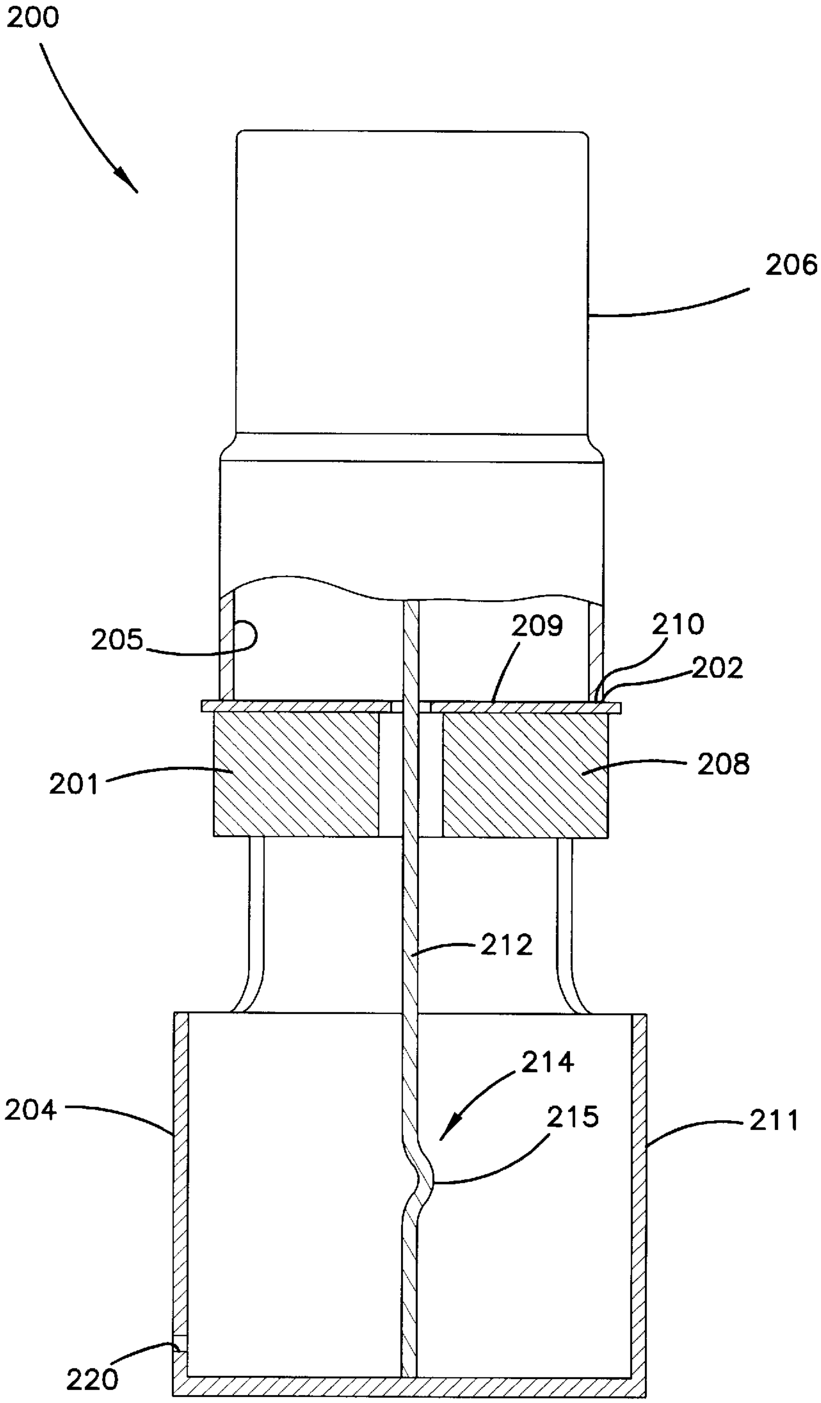
FIG. 16 is a schematic, partially cross-sectional, partially broken away view of the embodiment of the valve assembly depicted in FIG. 15, and showing the valve assembly in a closed position, in accordance with principles of the present invention.

For example, projection 215 interferes with float 201 as it moves from the resting position in float support region 211 to the closed or sealed position shown in FIG. 16. For example, if vibration causes float 201 to move from its resting position shown in FIG. 15, it bumps into the projection 215 of the guidewire 212. This prevents float 201 from traveling any further toward the valve seat 202. If liquid begins to fill the housing construction, however, float 201 will float on the surface of the liquid and rise as the level rises, where it will easily travel over and traverse the projection 215 toward the valve seat 202.

In the example shown, guidewire 212 extends between a bottom of valve assembly 200 and region within outlet tube 206. For example, it should extend long enough such that the float 201 remains trapped in its guide path between its resting position in FIG. 15 and its closed position shown in FIG. 16. In the specific preferred embodiment shown, the guidewire 212 extends into the volume 205 of the outlet tube 206.

As can be seen in FIGS. 15 and 16, float 201 includes a guidewire housing slot 213 extending therethrough. Guidewire housing 213 slideably accommodates the guidewire 212 and allows the float 201 to slideably move along its float path between open positions and its closed position, FIG. 16.

Attention is directed to FIG. 16. In FIG. 16, it can be seen that sealing structure 209 has an outermost dimension which is greater than the outermost dimension of the valve seat 202. If circular, the sealing structure 209 has a diameter which is greater than the diameter, if circular, of the valve seat 202. This permits the valve assembly 200 to be closed to liquid flow therethrough.

In operation, during normal conditions when the air cleaner is above any level of liquid, the float 201 is held within the float support region 211. Air is filtered through the air cleaner, as normal. As the vehicle and therefore the air cleaner move, the air cleaner may be subject to vibration. As the air cleaner vibrates or bounces, the float 201 is maintained within the float support region 211 and away from the valve seat 202 due to the non-linear extension 214. If the vehicle is driven into deep liquid or water to a level which is above the inlet of the housing, the liquid reaches the outlet assembly housing 204, and the float 201 floats on the surface of the water or liquid. As the liquid rises, the float 201 floats on the surface of the water and around the projection 215. As the liquid rises and gets the float 201 close to the outlet 206, air flow forces, drag, and/or vacuum facilitate the float 201 seating quickly in the valve seat 202 to block the outlet 206. When float 201 blocks the air outlet 206, the air intake to the engine is cut off, and the engine shuts down. The float 201 also prevents the liquid or water from being passed or sucked into the engine. The float 201 stays positioned on the valve seat 202 until the liquid level falls, even if the engine is turned off. As the liquid level falls, the liquid is allowed to drain through an aperture 220 in the outlet assembly housing 204, and an aperture in the housing (for example, aperture 25, FIG. 1). As the liquid level falls, the float 201 falls from the valve seat 202. This permits the engine to again be started, where air is allowed to flow through the air cleaner and out through the outlet tube 206 into the engine.

One example construction

In the following paragraphs, specific examples of a valve assembly are described. The valve assembly described is that as shown in FIGS. 2–5. It is understood, of course, that alternative constructions and dimensions may be utilized.

Outlet assembly 27 has a largest cross-sectional dimension at region where outlet assembly 27 joins filter element section 30 of about 7–7.25 inches (about 177.8–184.2 mm), for example, about 7.1 inches (about 180.3 mm). The width of outlet assembly 27 is about 3.8–4.2 inches (about 96.5–106.7 mm), for example, about 4 inches (about 101.6 mm). Outlet tube 48 of valve construction housing 42 has an inner diameter of about 2.3–2.5 inches (about 58.4–63.5 mm), for example, about 2.4 inches (about 61.0 mm). It has an outer diameter of about 2.6–2.9 inches (about 66–73.7 mm), for example, about 2.75 inches (about 69.9 mm). Housing construction 42 has a height between end 52 and end 53 of about 10–11 inches (about 254–279.4 mm), for example, about 10.6 inches (about 269.2 mm).

Wall member 54 extends between first end 52 and window region 56 about 3.5–3.7 inches (about 88.9–94.0 mm), for example, about 3.6 inches (about 91.4 mm). The inner diameter of float support region 50 is about 2.8–3 inches (about 71.1–76.2 mm), for example, about 2.9 inches (about 73.7 mm).

First ring 66 is located a distance of about 2.3–2.5 inches (about 58.4–63.5 mm), for example, about 2.4 inches (about 61.0 mm) from first end 52. Second ring 67 is located a distance of about 3.4–3.6 inches (about 86.4–91.4 mm), for example, about 3.5 inches (about 88.9 mm) from first end 52. Valve assembly 40 is used in an air cleaner housing 21 having a nominal size of about 5 in.×7 in., (about 127×177.8 mm) oval. It is used to filter air intake in engines having sizes typically of about 2–8 liter piston displacement and horsepower of about 100–300 (about 75 kw to 224 kw).

For example, the ratio of the float diameter to the valve seat inside diameter is at least 1.05. For example, a 2.5 in. diameter float would have a valve seat no larger than 2.38 in.

The above specification, examples and data provide a complete description of the manufacture and use of the invention. Many embodiments of the invention can be made without departing from the spirit and scope of the invention.

What is claimed is:

1. An air cleaner assembly comprising:
(a) an air cleaner housing having an air inlet arrangement and an air outlet arrangement;
(b) a filter element within the housing; said filter element being downstream of said inlet arrangement and upstream of said outlet arrangement; and
(c) a valve assembly within the housing downstream of said filter element; said valve assembly including a float and a valve seat;
(i) said valve seat circumscribing said air outlet;
(ii) said float being movable between first and second positions along a float path;
(A) said first position including said float being positioned away from said valve seat;
(B) said second position including said float being positioned within said valve seat to obstruct said air outlet in response to a selected liquid volume within said housing; and
(iii) said housing including a projection arrangement; said projection arrangement being constructed and arranged to inhibit movement of said float along said float path to said second position, unless at least said selected liquid volume within said housing is attained.

2. An air cleaner assembly according to claim 1 wherein:
(a) said valve assembly includes a tube holding said float;
(i) said tube including said projection arrangement.

3. An air cleaner assembly according to claim 2 wherein:
(a) said projection arrangement includes a plurality of obstructions projecting inwardly to inhibit float movement along said float path.

4. An air cleaner assembly according to claim 3 wherein:
(a) said obstructions include at least first and second eccentric, spaced rings.

5. An air cleaner assembly according to claim 1 further including:
(a) a guide rod along said float path; said float being mounted on said guide rod; and
(b) wherein said projection arrangement includes a projection in said guide rod.

6. An air cleaner assembly according to claim 5 wherein:
(a) said projection comprises a smooth wave in said guide rod.

7. An air cleaner assembly according to claim 1 wherein:
(a) said float is spherical in shape.

8. An air cleaner assembly according to claim 1 wherein:
(a) said float is cylindrical in shape.

9. An air cleaner assembly comprising:
(a) an air cleaner housing having an air inlet arrangement and an air outlet arrangement;
(b) a filter element operably installed within said air cleaner housing; and
(c) a valve assembly within said air cleaner housing; said valve assembly including a float and a valve seat;
(i) said float being movable between first and second positions along a float path;
(A) said first position including said float being positioned away from said valve seat;
(B) said second position including said float being positioned within said valve seat and obstruct said air outlet in response to a selected liquid volume within said housing; and
(ii) said housing including a projection arrangement; said projection arrangement being constructed and arranged to inhibit movement of said float along said float path to said second position, unless at least said selected liquid volume within said housing is attained.

10. An air cleaner assembly according to claim 9 wherein:
(a) said valve assembly includes a tube holding said float;
(i) said tube including said projection arrangement.

11. An air cleaner assembly according to claim 10 wherein:
(a) said projection arrangement includes a plurality of obstructions projecting inwardly to inhibit float movement along said float path.

12. An air cleaner assembly according to claim 11 wherein:

(a) said obstructions include at least first and second eccentric, spaced rings.

13. An air cleaner assembly according to claim 9 further including:

(a) a guide rod along said float path.

14. An air cleaner assembly according to claim 13 wherein:

(a) said float is mounted on said guide rod.

15. An air cleaner assembly according to claim 13 wherein:

(a) said projection arrangement includes at least one projection in said guide rod.

16. An air cleaner assembly according to claim 15 wherein:

(a) said projection comprises a wave in said guide rod.

17. An air cleaner assembly comprising:

(a) an air cleaner housing having an air inlet arrangement and an air outlet arrangement;

(b) a filter element within the housing; said filter element being downstream of said inlet arrangement and upstream of said outlet arrangement; and (c) a valve assembly within the housing downstream of said filter element; said valve assembly including a float, a valve seat, and a guide rod;

(i) said float being movable between first and second positions along a float path;

(A) said first position including said float being positioned away from said valve seat;

(B) said second position including said float being positioned within said valve seat to obstruct said air outlet in response to a selected liquid volume within said housing; and (ii) said guide rod being positioned along at least a portion of said float path;

said guide rod including at least one projection;

(A) said float being mounted on said guide rod; and (B) said at least one projection inhibiting movement of said float along said float path to said second position, unless at least said selected liquid volume within said housing is attained.

18. An air cleaner assembly according to claim 17 wherein:

(a) said projection comprises a wave in said guide rod.

19. An air cleaner assembly according to claim 17 wherein:

(a) said guide rod extends between a bottom of said valve assembly and a volume within said air outlet arrangement.

20. An air cleaner assembly according to claim 17 wherein:

(a) said float has a cylindrical shape and includes a sealing structure;

(i) said sealing structure forming a seal with said valve seat, when said float engages said valve seat to block fluid flow into the outlet tube.

* * * * *